(12) United States Patent
Meyer

(10) Patent No.: US 10,047,886 B2
(45) Date of Patent: Aug. 14, 2018

(54) BREAKAWAY COUPLING FOR A LIQUID LINE

(75) Inventor: Heinz-Ulrich Meyer, Hamburg (DE)

(73) Assignee: ELAFLEX HIBY TANKTECHNIK GMBH & CO., Hamburg (DE)

( * ) Notice: Subject to any disclaimer, the term of this patent is extended or adjusted under 35 U.S.C. 154(b) by 410 days.

(21) Appl. No.: 14/122,098

(22) PCT Filed: May 29, 2012

(86) PCT No.: PCT/EP2012/060030
§ 371 (c)(1),
(2), (4) Date: Nov. 25, 2013

(87) PCT Pub. No.: WO2012/163910
PCT Pub. Date: Dec. 6, 2012

(65) Prior Publication Data
US 2014/0097610 A1     Apr. 10, 2014

(30) Foreign Application Priority Data
Jun. 1, 2011 (EP) ..................................... 11168432

(51) Int. Cl.
*F16L 37/44* (2006.01)
*F16L 27/08* (2006.01)
(Continued)

(52) U.S. Cl.
CPC ............ *F16L 27/08* (2013.01); *B67D 7/3218* (2013.01); *B67D 7/42* (2013.01); *F16L 37/088* (2013.01); *F16L 55/1015* (2013.01)

(58) Field of Classification Search
CPC ...... F16L 55/1015; F16L 37/088; F16L 37/38; F16L 37/44; F16L 55/1007; B67D 7/3218
(Continued)

(56) References Cited

U.S. PATENT DOCUMENTS 3,976,100 A     8/1976  Souslin
4,269,226 A  *  5/1981  Allread .................... F16L 37/23
                                                            137/614
(Continued)

FOREIGN PATENT DOCUMENTS

DE            1012498 B      7/1957
DE            4429498 C1     8/1995
(Continued)

OTHER PUBLICATIONS

International Search Report, dated Jul. 12, 2012, for International Patent Application No. PCT/EP2012/060030, 12 pages.

*Primary Examiner* — Brian E Glessner
*Assistant Examiner* — Daniel J Kenny
(74) *Attorney, Agent, or Firm* — Casimir Jones, S.C.; Mary Ann D. Brow

(57) ABSTRACT

The invention relates to a breakaway coupling for a liquid line comprising a first and a second coupling part (3, 4) which each have a liquid connection and which can be separated by a defined force in the axial direction of the coupling and/or a tilting moment acting transversally to the axial direction. According to the invention, an antitwist device (12) is provided which prevents the first and second coupling part (4, 3) from twisting relative to one another during the operation of the coupling.

16 Claims, 7 Drawing Sheets

(51) Int. Cl.
   *F16L 37/088*    (2006.01)
   *F16L 55/10*     (2006.01)
   *B67D 7/32*      (2010.01)
   *B67D 7/42*      (2010.01)

(58) Field of Classification Search
   USPC .................................. 285/86, 89, 1, 304, 81
   See application file for complete search history.

(56) References Cited

U.S. PATENT DOCUMENTS

| | | | | |
|---|---|---|---|---|
| 4,899,792 A | * | 2/1990 | Podgers | F16L 27/047 |
| | | | | 137/68.14 |
| 4,927,188 A | * | 5/1990 | Sands | F16L 41/00 |
| | | | | 285/136.1 |
| 4,993,460 A | * | 2/1991 | Robinson | B67D 7/56 |
| | | | | 116/273 |
| 5,261,514 A | * | 11/1993 | Evans | H02G 11/02 |
| | | | | 174/55 G |
| 5,577,538 A | | 11/1996 | Sunderhaus et al. | |
| 6,447,017 B1 | * | 9/2002 | Gilbreath | F16L 33/2075 |
| | | | | 285/256 |
| 8,123,259 B2 | * | 2/2012 | Swart | F16L 23/003 |
| | | | | 285/330 |
| 8,752,597 B2 | * | 6/2014 | Tumarkin | B67D 7/42 |
| | | | | 141/206 |
| 8,931,499 B2 | * | 1/2015 | Clever | B67D 7/3218 |
| | | | | 137/1 |
| 2008/0157525 A1 | | 7/2008 | Yoshino et al. | |

FOREIGN PATENT DOCUMENTS

| | | |
|---|---|---|
| EP | 0555558 A1 | 8/1993 |
| EP | 2133615 A1 | 12/2009 |
| EP | 2228582 A1 | 9/2010 |
| WO | 92/08920 A1 | 5/1992 |

* cited by examiner

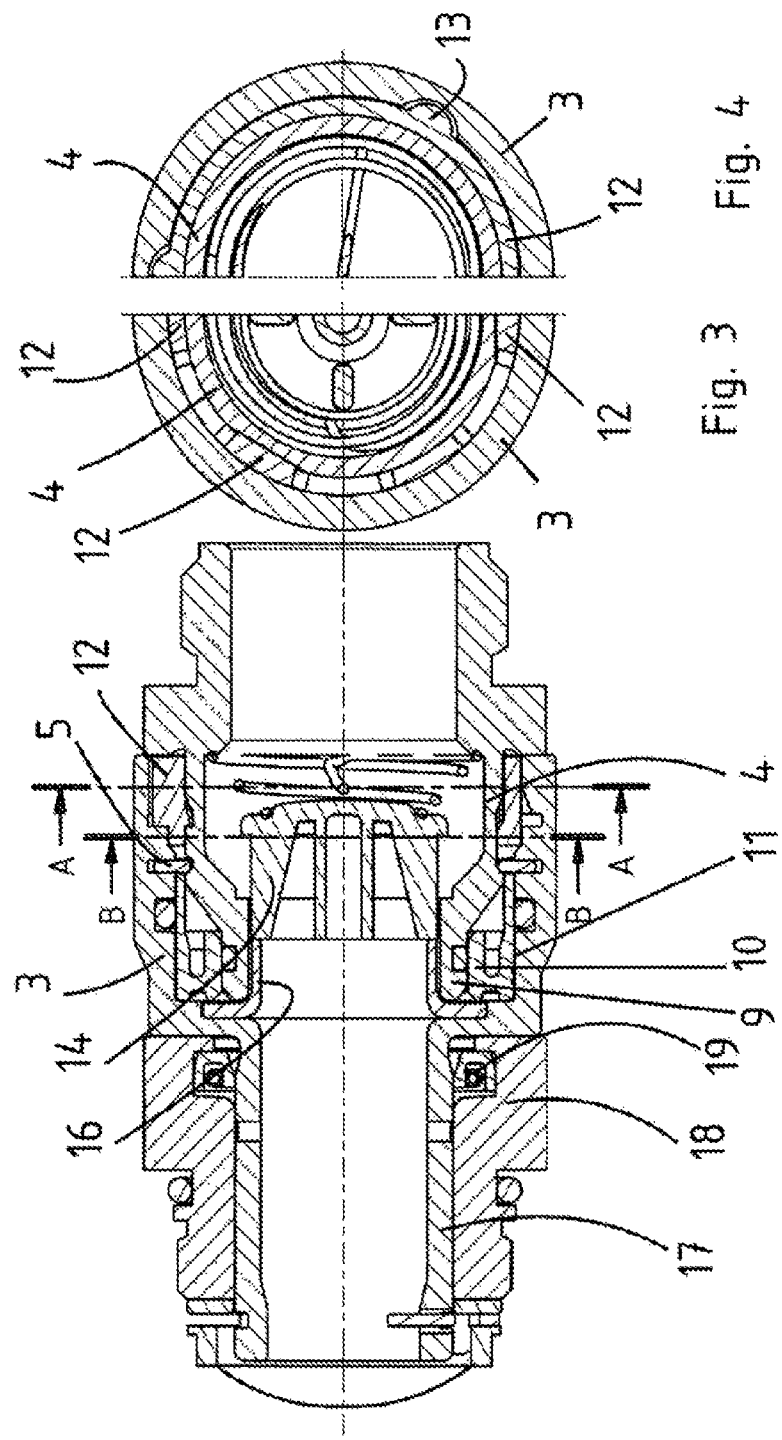

PRIOR ART EMBODIMENT

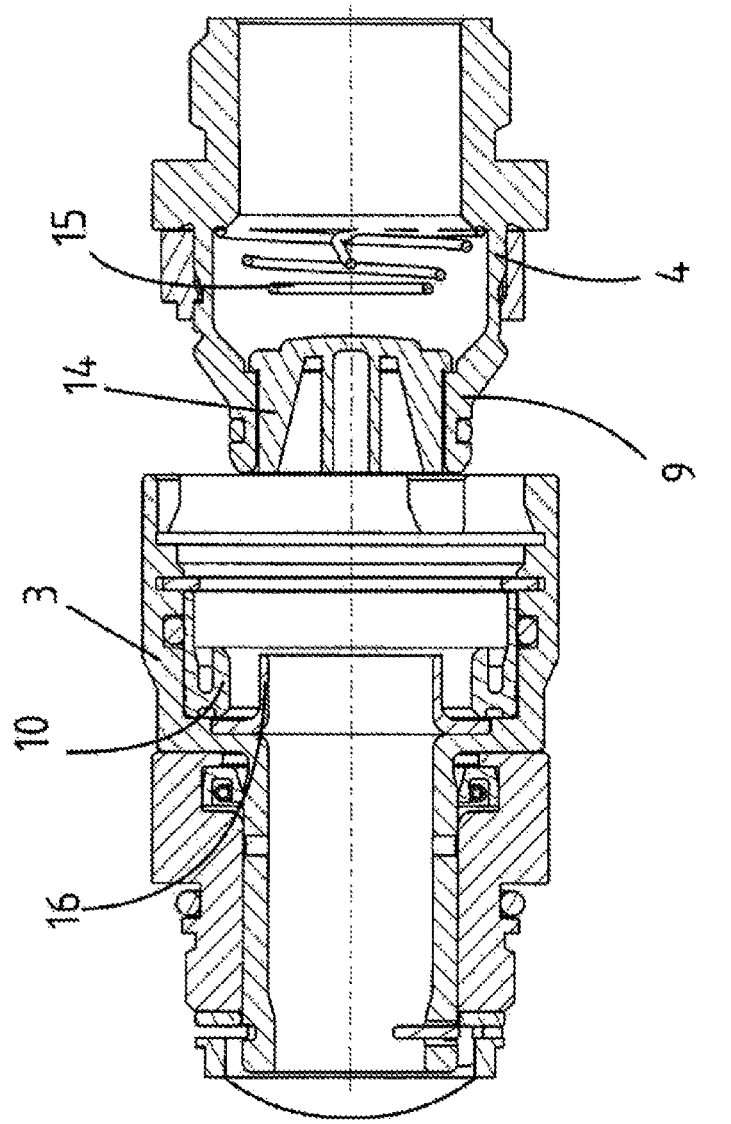

BREAKAWAY COUPLING FOR A LIQUID LINE

This application is a § 371 U.S. National Entry of PCT/EP2012/060030, filed May 29, 2012, which is incorporated by reference in its entirety and which claims the benefit of European Application No. 11168432.0, filed Jun. 1, 2011.

The invention relates to a breakaway coupling for a liquid line according to the preamble of claim 1. Also subject matter of the invention is a fuel nozzle having a breakaway coupling according to the invention, and a fuel dispenser which is equipped with such a fuel nozzle.

When motor vehicles are refueled, it is sometimes forgotten to return the fuel nozzle to the fuel dispenser after the refueling process has been completed. If the vehicle sets off with the fuel nozzle still positioned in the tank, a breakaway coupling provided on the delivery hose generally in the region of the connection end of the fuel nozzle ensures that the fuel nozzle is separated from the delivery hose in a defined manner at this point and the delivery hose is prevented from tearing or the fuel dispenser is prevented from being pulled over. Such a breakaway coupling is known for example from EP 0 555 558 A1.

The present invention is based on the object of creating a breakaway coupling of the type mentioned at the beginning, which allows separation with a defined breakaway force over a long operating period.

The invention achieves this object in that an anti-rotation means is provided which prevents rotation of the first and second coupling parts with respect to one another when the coupling is in operation.

First of all, a number of terms and expressions used in the context of the invention will be explained.

A liquid line serves for transporting liquids. The invention is suitable in particular for liquid lines in the region of filling stations, refineries or chemical plants, more preferably for flexible lines (hoses) which are provided for dispensing such liquids. A breakaway coupling is a coupling which is liquid-tight during operation and can be separated by the application of a defined pulling force and/or a defined tilting moment. Separation preferably takes place in a nondestructive manner, so that the breakaway coupling can be joined together again and reused following a breakaway.

The coupling has two coupling parts which are able to be joined together and are separable by the abovementioned force, and which have in each case a liquid connection at their ends remote from the coupling sides. This liquid connection may be for example a connection for a delivery hose or fuel nozzle.

According to the invention, an anti-rotation means is provided which prevents rotation of the first and second coupling parts with respect to one another when the coupling is in operation (i.e. in the joined-together state). The expression rotation denotes in this case a rotation of the first and second coupling parts with respect to one another about the coupling axis, i.e. the longitudinal or axial direction of the coupling, in which the liquid flow takes place.

The invention has recognized that, in the case of breakaway couplings of the prior art, the two coupling parts frequently rotate with respect to one another during operation, and this can result in coupling parts running into opposing surfaces and thus the pulling force or the tilting moment which is required for separating the coupling changes over time, frequently increasing. This is particularly frequently the case for fuel dispensers in which the fuel nozzle is regularly rotated relative to the delivery hose in the course of refueling operations. Although an articulated or swivel connection, which is described in more detail below, is, as a general rule, provided between the delivery hose and the fuel nozzle in order to allow the fuel nozzle to rotate freely relative to the delivery hose, the invention has recognized that in the prior art a part of the rotary movements is very frequently absorbed by the breakaway coupling and results in the first coupling part rotating relative to the second coupling part and thus in the described run-in grooves.

According to the invention, the first and second coupling parts are preferably configured as male and female coupling parts that engage in one another. In the prior art, the male and female coupling parts must be oriented generally only coaxially in order to be joined together and can be assembled at any rotation angle with respect to one another (under the precondition of a coaxial orientation). In the joined-together state, they are in principle freely rotatable with respect to one another. According to the invention, it is now provided that the coupling parts are, from the outset, either joined together only in one or more angular positions with respect to one another and are held in this angular position in the joined-together state, or, in the joined-together state, an anti-rotation means fixes the angular position of the two coupling parts with respect to one another once it has been taken up. For this purpose, the anti-rotation means may comprise a locking element which is arranged between the first and second coupling parts. With male and female coupling parts engaging in one another, this locking element may be in particular a locking ring arranged in the circumferential direction between the male and female coupling parts. Such a locking ring is preferably non-rotationally symmetrical and forms an anti-rotation means by way of a form fit with the first and second coupling parts. The form fit between the locking ring and each of the two coupling parts may be produced for example by forms which deviate cross-sectionally from the circular form, such as flat portions, grooves and ribs that engage in one another, or the like.

According to the invention, the actual function of the breakaway coupling, namely ensuring a breakaway in the case of a defined pulling force or a tilting moment, is ensured by a latching ring which engages in associated first and second latching ring receptacles of the first and second coupling parts and is unlatchable by a defined force in the axial direction of the coupling and/or by a tilting moment acting transversely to the axial direction. This is an operating principle as is described in principle in the abovementioned EP 0 555 558 A1. Either the latching ring has an inclined surface on its side facing away from the separating direction of the breakaway coupling or, preferably, the first and/or second latching ring receptacle has/have an inclined surface on their side facing in the separating direction of the breakaway coupling, the latching ring being able to be levered out via said inclined surface. The expression "separating direction of the coupling" designates that direction, as seen in a relative manner from the coupling element, in which the respectively other coupling element moves when the breakaway coupling separates. Thus, as seen from the first coupling element, the separating direction is directed in the longitudinal direction of the coupling toward the second coupling element, or the liquid connection thereof, and as seen from the second coupling element, the separating direction is in exactly the opposite direction. The expression "inclined surface" designates preferably a surface which encloses an angle with the radial direction of the respective coupling element and thus, when pulling forces or tilting moments occur, makes it possible, or easier, to slide the latching ring out of the corresponding latching ring receptacle.

Preferably, the first and second coupling parts have tilting play with respect to one another. This means that they can be tipped (preferably counter to the force of a restoring element such as a restoring spring) out of the coaxial orientation with respect to one another by a certain angle. Such slight tipping can make it easier to lever or slide the latching ring out of the associated latching ring receptacle and ensures that a defined separation of the breakaway coupling occurs even when a considerable part of the separating force acts as a tilting moment transversely to the axial direction of the breakaway coupling. In practice, such separation of the breakaway coupling by tilting moments acting transversely to the axial direction is very common, since, as a general rule, a fuel nozzle is plugged into the vehicle tank transversely to the direction of travel of a vehicle, and when the vehicle is driven away with the fuel nozzle still located in the tank, a considerable part of the force acting on the breakaway coupling is applied transversely to the axial direction as a tilting moment.

As already described above, a rotary or swivel connection is generally provided between the fuel nozzle and delivery hose of a fuel dispenser, said rotary or swivel connection allowing the fuel nozzle to rotate in an unlimited manner relative to the delivery hose. In the context of the invention, it is preferred for this rotary joint or this swivel connection to be arranged on the first or second coupling element, i.e. the corresponding coupling element has this rotary or swivel connection. A rotation of the corresponding coupling part relative to the associated liquid connection of the coupling part is thus possible. Preferably, a swivel nut which is arranged in a rotatable manner on the outer circumference of a coupling part may be provided, said swivel nut having the liquid connection associated with this coupling part. Via this swivel nut, the liquid connection and thus the attached delivery hose or the fuel nozzle is thus freely rotatable with respect to the other coupling part having the corresponding liquid connection.

In the context of the invention, various measures may be provided in order to provide easy and low-resistance rotatability of this additional articulated or swivel connection. For example, provision may be made for the diameter on which the swivel nut is arranged to be as small as possible in order to keep the torque required for rotating the swivel nut as small as possible. In this way, relatively large torques are prevented from the outset from acting on the breakaway coupling (i.e. torques in a relative manner from the first to the second coupling part). Provision can further be made for the swivel nut to be rotatable as smoothly as possible with respect to the corresponding coupling part, for example by means of a slip ring.

A breakaway of the coupling generally takes place in a nondestructive manner, such that the breakaway coupling can be joined together again and reused. However, before being joined together, the coupling and the components thereof should be checked by qualified personnel for damage, contamination and the like. In order to make improper reassembly, for example by unauthorized filling station personnel, harder or impossible, provision may be made for the first and second coupling parts to be able to be joined together again following a breakaway only by means of a special tool and/or by means of high joining forces, such as vise mounting, for example. For example, one coupling part may have a spring element such as a spring strut, for example, which makes joining together again difficult and only possible counter to the spring action of such a spring element.

The breakaway coupling according to the invention may have an inspection window for checking the flow rate, which may be equipped with a propeller that is movable by the liquid flow.

Also subject matter of the invention is a fuel nozzle which has a breakaway coupling according to the invention. Further subject matter of the invention is a fuel dispenser having a fuel nozzle according to the invention. The fuel dispenser and fuel nozzle are connected in the usual manner by a delivery hose. This fuel dispenser has a leak-prevention means preferably in the region of the coupling part, mounted on the delivery-hose side, of the breakaway coupling. This prevents liquid (fuel) from leaking out of the broken away coupling part at the delivery-hose end following a breakaway. It may be, for example, a sealing cone which prevents fuel from leaking out in the event of a breakaway and ensures that no more than a maximally permitted residual quantity of fuel (usually 120 ml) leaks out.

An exemplary embodiment of the invention is explained in the following text with reference to the drawing, in which:

FIG. 1 schematically shows a fuel nozzle according to the invention having a breakaway coupling according to the invention;

FIG. 2 shows a longitudinal section through a breakaway coupling according to the invention;

FIGS. 3 and 4 show the configuration of the locking ring in cross sections in the planes A-A and B-B in FIG. 2;

FIG. 7 shows a longitudinal section through a coupling according to the invention in the separated state;

Figure 1:
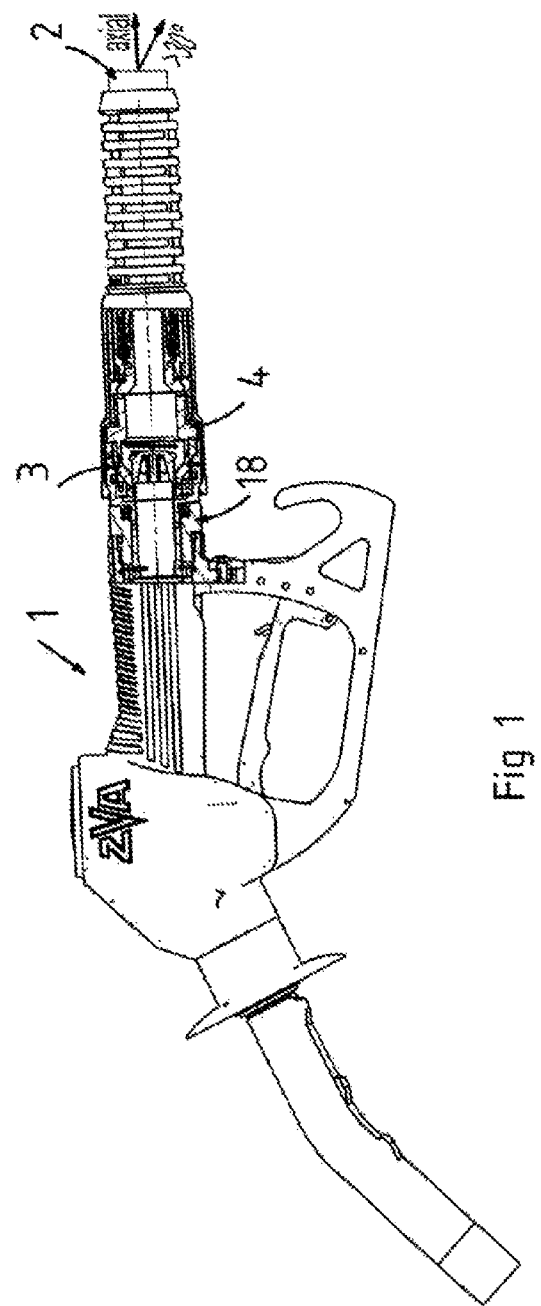

FIG. 1 shows a fuel nozzle 1 for refueling motor vehicles. A delivery hose 2 connects the fuel nozzle 1 to a fuel dispenser (not illustrated). The connection between the fuel nozzle 1 and delivery hose 2 is established via a breakaway coupling which has a female coupling element 3 on the fuel-nozzle side and a male coupling element 4 on the delivery-hose side (see FIG. 2).

Figure 5:
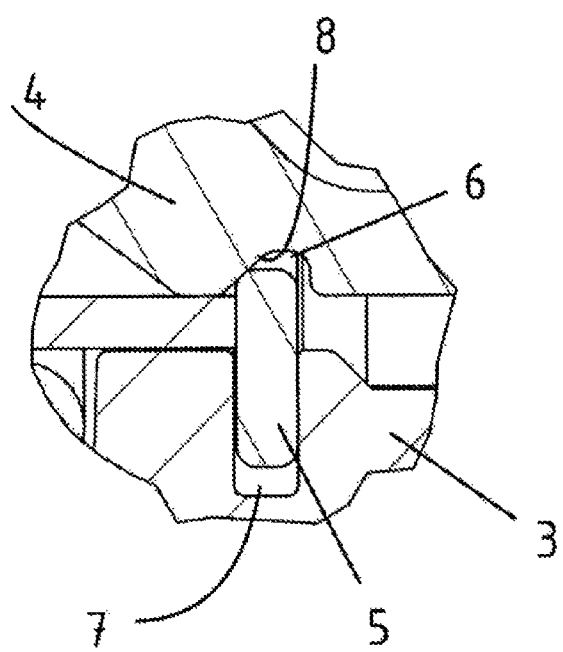
FIG. 5 shows a detail of the latching ring in the latching ring receptacles.

FIG. 2 shows the two coupling elements 3, 4 in the joined-together state. The two coupling parts are secured against axial separation by a latching ring 5 which engages in a first latching ring receptacle 6 of the male coupling part 4 and a second latching ring receptacle 7 of the female coupling part 3 (see FIG. 5). The first latching ring receptacle 6 has an inclined surface 8 with respect to the radial direction of the coupling on its in the separating direction of the breakaway coupling (i.e. in the direction in which the male coupling element 4 can be pulled out of the female coupling element 3). This inclined surface 8 makes it easier to slide the latching ring 5 out of the latching ring receptacle 6 when a pulling force is applied to the male coupling element 4 relative to the female coupling elements 3 or a tilting moment acts thereon.

It can be seen in FIG. 2 that the male coupling element 4 and the female coupling element 3 have tilting play with respect to one another. As soon as these two coupling elements 3, 4 are tipped with respect to one another, this takes place counter to the restoring force of the restoring spring 10 which annually surrounds the end region 9 of the coupling element 4 and is supported against an inner surface 11 of the female coupling element 3. The restoring spring seeks to orient the male and female coupling elements 3, 4 in an exactly coaxial manner with respect to one another.

Introduced concentrically between the male and female coupling elements 3, 4 is a locking ring 12. FIGS. 3 and 4 represent the latter in the two sectional planes A-A and B-B in FIG. 2. It can be seen how the locking ring 12 in the plane A-A forms an anti-rotation means by means of ribs on the locking ring 12, said ribs being indicated at 13 and interacting in a form-fitting manner with one another, and associated recesses in the female coupling element 3. In FIG. 3 (section B-B) it can be seen how the locking ring 12 interacts in a form-fitting manner in this region with the male coupling element 4 in order to prevent it from rotating. As a result, the male coupling element 4 and the female coupling element 3 are prevented from rotating relative to one another in this way.

Figure 6:
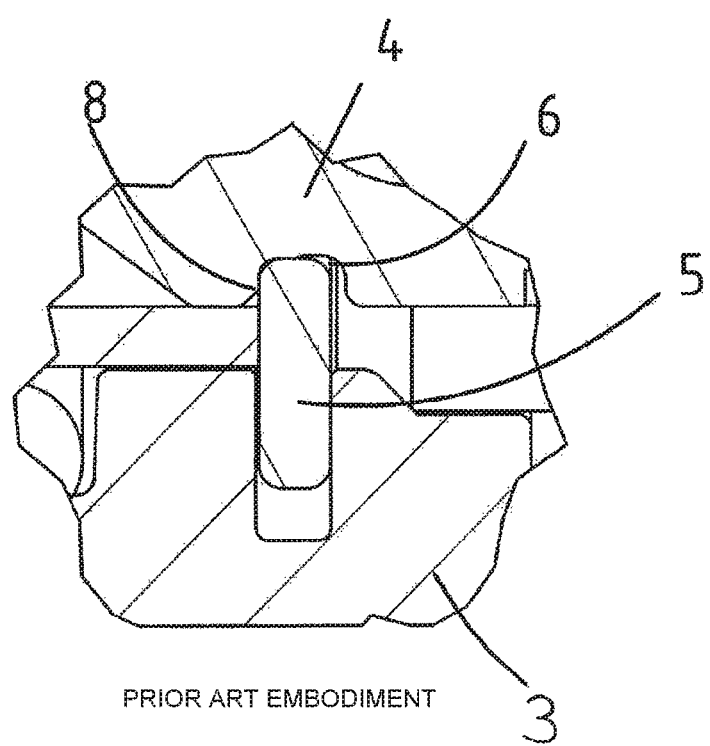
FIG. 6 shows a view similar to FIG. 5 of a latching ring (not according to the invention) which has run into an inclined surface in the case of a breakaway coupling of the prior art.

This prevention of rotation has the effect that the latching ring 5 cannot run into the inclined surface 8. FIG. 6 (not according to the invention) shows how, in the case of a breakaway coupling of the prior art, one edge of the latching ring 5 can run into the inclined surface 8 and notch the latter as a result of unintentional rotation of the coupling elements 3, 4 with respect to one another. A considerably higher force is now necessary to lever or pull the latching ring 5 out of the recess 6 via the inclined surface 8. The breakaway coupling no longer works with the desired defined breakaway force.

The male coupling element 4 has in its interior a valve cone 14 which, in the separated state of the breakaway coupling (FIG. 7), closes the coupling-side end of the male coupling element 4 in a liquid-tight manner. It is preloaded in the closing direction by a spring, indicated at 15, and by the liquid pressure in the filling hose 2. In the assembled state of the breakaway coupling, the valve cone 14 is urged into an open position (see FIG. 2) by an annular element 16, impinging on the end side of the valve cone 14, in the female coupling element 3.

A swivel nut 18 is mounted in a freely rotatable manner on the fuel-nozzle-side end 17 of the female coupling element 3. A conductive slip ring 19 ensures smooth free rotatability and conductivity and has the effect that no or at most a little torque acts on the female coupling element 3 relative to the male coupling element 4. As can be seen in FIG. 1, the connection of the fuel nozzle 1 engages radially around the swivel nut 18 from the outside, such that the fuel nozzle 1 is freely rotatable with respect to the delivery hose 2 by means of the swivel nut 18.

If the removal of the fuel nozzle 1 is forgotten after a vehicle has been refueled, and said fuel nozzle 1 remains in the filler neck of the vehicle, when the vehicle is driven away, a pulling force and/or a tilting moment is exerted on the breakaway coupling. Usually, in the process, the male coupling element 4 is canted or tipped relative to the female coupling element 3 and the latching ring 5 slides along the inclined surface 8 out of the latching ring receptacle 6 such that the male and female coupling elements 3, 4 are separated from one another. The coupling is defined such that the necessary separating forces are smaller than those forces which could cause damage to the other components of the fuel dispenser (hose, dispenser base or the like). Usual separating forces may be for example between 800 and 1500 N. Following the breakaway, the valve cone 14 closes and prevents the filling hose 2 from leaking.

Figure 9:
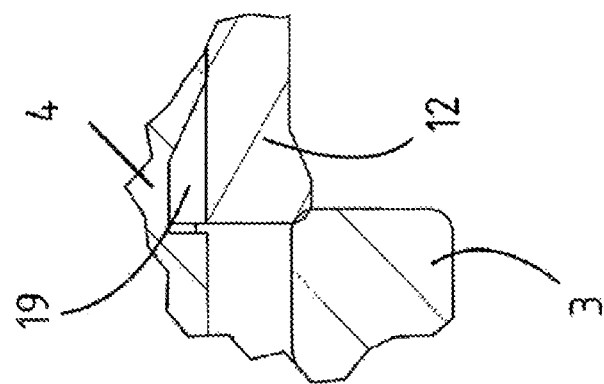
FIG. 9 shows a detail from FIG. 8.
Figure 8:
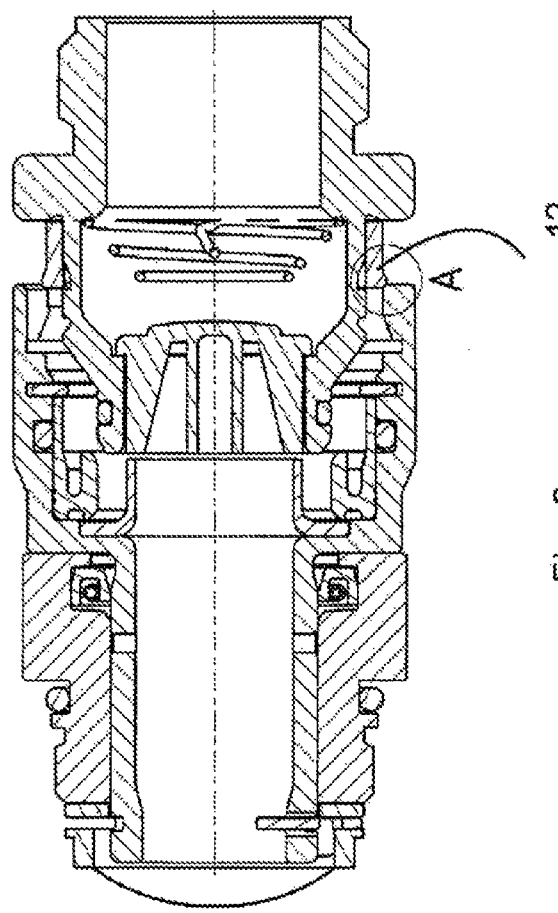
FIG. 8 shows the action of the spring element for preventing unauthorized reassembly of the coupling.

Following a breakaway operation, the breakaway coupling must be checked for damage and contamination and can subsequently be reassembled. It can be seen in FIGS. 8 and 9 how a special configuration of the locking ring 12 can prevent the breakaway coupling from being joined together again by unauthorized personnel following a breakaway, or at least can make this harder. As is shown in particular in the detail in FIG. 9, that end of the locking ring 12 that faces the female coupling element 3 has a slight radial oversize which makes it harder to join the male coupling element 4 and female coupling element 3 together. Only by applying a high force acting in the axial direction (for example vise mounting) can the coupling elements 3, 4 be joined together again. In this case, the radial oversize shown in FIG. 9 is temporarily overcome in that the shown end of the locking ring 12 is pushed into the recess 19 in the male coupling element 4.

Figure 10:
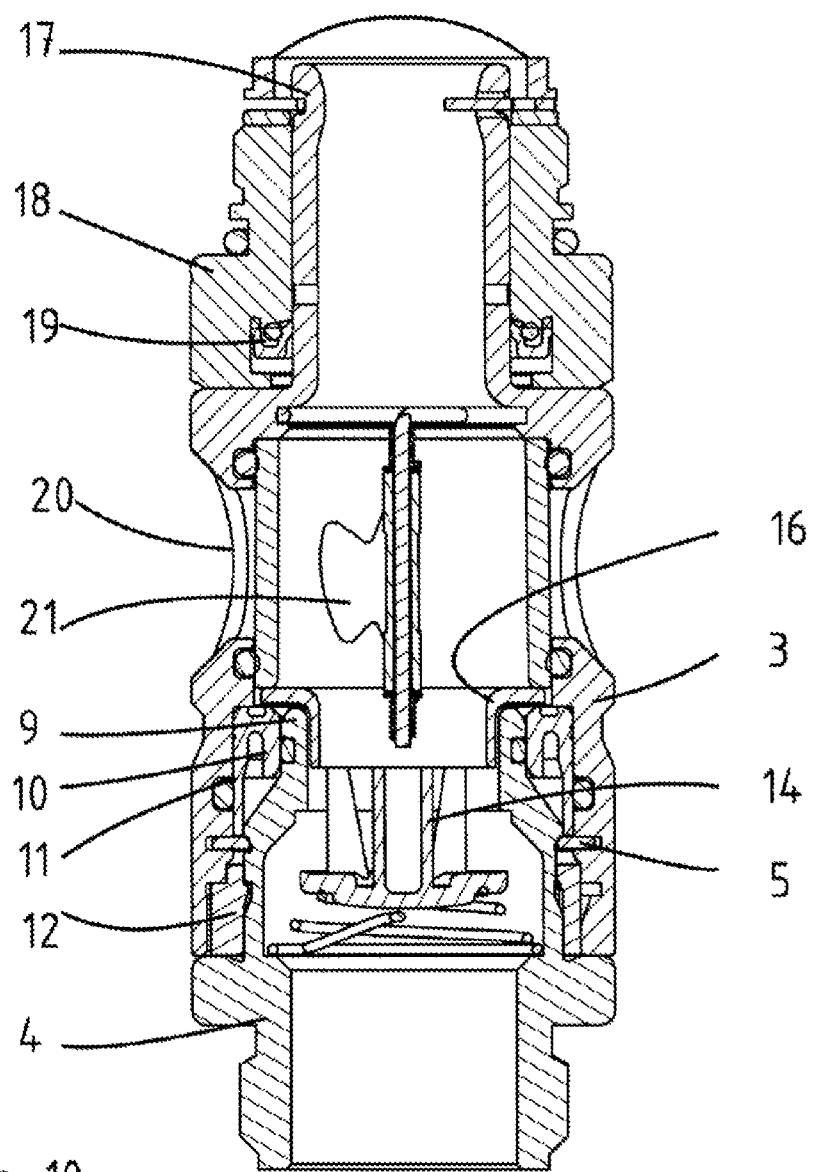
FIG. 10 shows a longitudinal section through a second embodiment of a breakaway coupling according to the invention having an inspection window.

FIG. 10 shows a second embodiment of the invention. The breakaway coupling illustrated here corresponds largely to the embodiment illustrated in FIG. 2, identical reference signs designate identical components. In this embodiment, an inspection window 20 is provided which makes it possible to view the flowing liquid from the outer periphery and so is suitable in particular for monitoring bubble-free fueling. A propeller 21 driven by the liquid flow allows improved optical monitoring of the fueling process.

The invention claimed is:

1. A breakaway coupling for a liquid line, having a first and a second coupling part (4, 3) which each have a liquid connection and which are separable by a defined force in the axial direction of the coupling and/or by a tilting moment acting transversely to the axial direction, characterized in that an anti-rotation means (12) is provided which prevents rotation of the first and second coupling parts (4, 3) with respect to one another when the coupling is in operation, wherein the first coupling part is configured as a male coupling part (4) and the second coupling part is configured as a female coupling part (3), and wherein the anti-rotation means comprises a locking element (12) which is arranged between the first and second coupling parts (4, 3), and wherein said breakaway coupling has a latching ring (5) which engages in a first latching ring receptacle (6) of the first coupling part (4) and a second latching ring receptacle (7) of the second coupling part (3), and which is unlatchable by a defined force in the axial direction of the coupling and/or by a tilting moment acting transversely to the axial direction.

2. The breakaway coupling of claim 1, wherein the locking element (12) comprises a locking ring that is not rotationally symmetrical and that forms an anti-rotation means by way of a form fit with the first and second coupling parts (4, 3).

3. The breakaway coupling of claim 1, wherein the latching ring (5) has an inclined surface (8) on its side facing away from the separating direction of the breakaway coupling or the first and/or second latching ring receptacle has/have an inclined surface (8) on their side facing in the separating direction of the breakaway coupling, the latching ring being able to be levered out via said inclined surface (8).

4. The breakaway coupling of claim 1, wherein the first and second coupling parts (4, 3) have tilting play with respect to one another.

5. The breakaway coupling of claim 4, wherein a restoring element (10) is provided which orients the first and second coupling parts in a coaxial manner with respect to one another.

6. The breakaway coupling of claim 1, wherein the first and/or second coupling element (4, 3) has/have a rotary joint (18) which allows the coupling part to rotate relative to the associated liquid connection.

7. The breakaway coupling of claim 6, wherein a swivel nut (18) which is arranged in a rotatable manner on the outer circumference of a coupling part is provided, said swivel nut (18) having the liquid connection associated with this coupling part.

8. The breakaway coupling of claim 7, wherein a conductive slip ring (19) is arranged between the swivel nut (18) and the coupling part (3).

9. The breakaway coupling of claim 1, wherein the first and second coupling parts (4, 3) are able to be joined together again following a breakaway only by means of a device.

10. The breakaway coupling of claim 9, wherein the device is a vise mounting.

11. The breakaway coupling of claim 1, wherein said breakaway coupling has an inspection window (20).

12. A fuel nozzle comprising a breakaway coupling as claimed in claim 1.

13. A fuel dispenser, comprising a fuel nozzle as claimed in claim 12, wherein said fuel dispenser has a leak-prevention means (14).

14. The fuel dispenser of claim 13, wherein said leak prevention means (14) is in the region of a coupling part mounted on a delivery-hose side of said breakaway coupling.

15. A fuel dispenser, comprising a fuel nozzle comprising a breakaway coupling for a liquid line, the breakaway coupling having a first and a second coupling part (4, 3) which each have a liquid connection and which are separable by a defined force in the axial direction of the coupling and/or by a tilting moment acting transversely to the axial direction, characterized in that an anti-rotation means (12) is provided which prevents rotation of the first and second coupling parts (4, 3) with respect to one another when the coupling is in operation, wherein the first coupling part is configured as a male coupling part (4) and the second coupling part is configured as a female coupling part (3), and wherein the anti-rotation means comprises a locking element (12) which is arranged between the first and second coupling parts (4, 3), wherein said fuel dispenser has a leak-prevention means (14).

16. The fuel dispenser of claim 15, wherein said leak prevention means (14) is in the region of a coupling part mounted on a delivery-hose side of said breakaway coupling.

* * * * *